United States Patent
Yamamoto

(10) Patent No.: US 10,175,144 B2
(45) Date of Patent: Jan. 8, 2019

(54) ROTATIONAL ENGINE SPEED DISPLAY DEVICE

(71) Applicant: Nissan Motor Co., Ltd., Yokohama-shi, Kanagawa (JP)

(72) Inventor: Yoshinori Yamamoto, Kanagawa (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 0 days.

(21) Appl. No.: 15/746,488

(22) PCT Filed: Sep. 16, 2015

(86) PCT No.: PCT/JP2015/076228
§ 371 (c)(1),
(2) Date: Jan. 22, 2018

(87) PCT Pub. No.: WO2017/046879
PCT Pub. Date: Mar. 23, 2017

(65) Prior Publication Data
US 2018/0209870 A1    Jul. 26, 2018

(51) Int. Cl.
| | | |
|---|---|---|
| *G06F 19/00* | (2018.01) | |
| *G01M 15/04* | (2006.01) | |
| *B60K 35/00* | (2006.01) | |
| *F02D 45/00* | (2006.01) | |
| *F16H 59/42* | (2006.01) | |
| *F16H 63/42* | (2006.01) | |

(Continued)

(52) U.S. Cl.
CPC ........... *G01M 15/046* (2013.01); *B60K 35/00* (2013.01); *F02D 45/00* (2013.01); *F16H 59/42* (2013.01);
(Continued)

(58) Field of Classification Search
CPC ................ B60K 2310/26; B60W 50/02
(Continued)

(56) References Cited

U.S. PATENT DOCUMENTS

| | | | | |
|---|---|---|---|---|
| 2007/0191184 A1* | 8/2007 | Kuwahara | ............. | F16H 63/502 477/115 |
| 2008/0147284 A1* | 6/2008 | Tuckfield | ................. | B60K 6/40 701/56 |

(Continued)

FOREIGN PATENT DOCUMENTS

| | | |
|---|---|---|
| JP | 2009-29401 A | 2/2009 |
| JP | 2009-220678 A | 10/2009 |

(Continued)

*Primary Examiner* — John Kwon
(74) *Attorney, Agent, or Firm* — Drinker Biddle & Reath LLP

(57) ABSTRACT

An actual gear ratio change amount (ΔGr) is calculated by subtracting a pre-shift gear ratio (Gb) from an actual gear ratio (Gr). A gear ratio (G) is calculated by multiplying the actual gear ratio change amount (ΔGr) by a predetermined coefficient (C) and adding the product value to the pre-shift gear ratio (Gb). When the shift is an upshift, the gear ratio (G) is compared with aa target gear shift ratio (Ga), and the greater value is set as a virtual gear ratio (Gv). When the shift is a downshift, then the gear ratio (G) is compared with the target gear ratio (Ga) and the smaller value is set as the virtual gear ratio (Gv). A virtual input shaft rotational speed (Nv) is calculated by first dividing the actual gear ratio (Gr) by the virtual gear ratio (Gv) to obtain a quotient and by dividing the actual input shift rotational speed (Nr) by that quotient. A slip amount (S) is calculated by subtracting the actual input shaft rotational speed (Nr) of the automatic transmission (3) from the engine rotational speed (Ne). Finally, the engine rotational speed for display (Nd) is calculated by adding the slip amount (S) to the virtual input shaft rotational speed (Nv).

6 Claims, 4 Drawing Sheets

(51) Int. Cl.
*F16H 63/40* (2006.01)
*F16H 61/02* (2006.01)
*F16H 59/70* (2006.01)

(52) U.S. Cl.
CPC ............. *F16H 63/40* (2013.01); *F16H 63/42* (2013.01); *B60K 2350/1076* (2013.01); *B60K 2350/352* (2013.01); *B60W 2710/0644* (2013.01); *F16H 2059/706* (2013.01); *F16H 2061/0218* (2013.01); *F16H 2063/423* (2013.01); *F16H 2063/426* (2013.01)

(58) Field of Classification Search
USPC .............. 701/51, 61, 74, 75, 93, 96, 99, 101
See application file for complete search history.

(56) References Cited

U.S. PATENT DOCUMENTS

| | | | |
|---|---|---|---|
| 2015/0166048 A1* | 6/2015 | Herrmann | B60K 6/445 701/22 |
| 2015/0353090 A1* | 12/2015 | Yoshino | B60W 10/04 701/54 |
| 2018/0148042 A1* | 5/2018 | Kobayashi | B60K 6/40 |

FOREIGN PATENT DOCUMENTS

| | | |
|---|---|---|
| JP | 2015-24766 A | 2/2015 |
| JP | 2015-121285 A | 7/2015 |
| JP | 2015-161654 A | 9/2015 |

\* cited by examiner

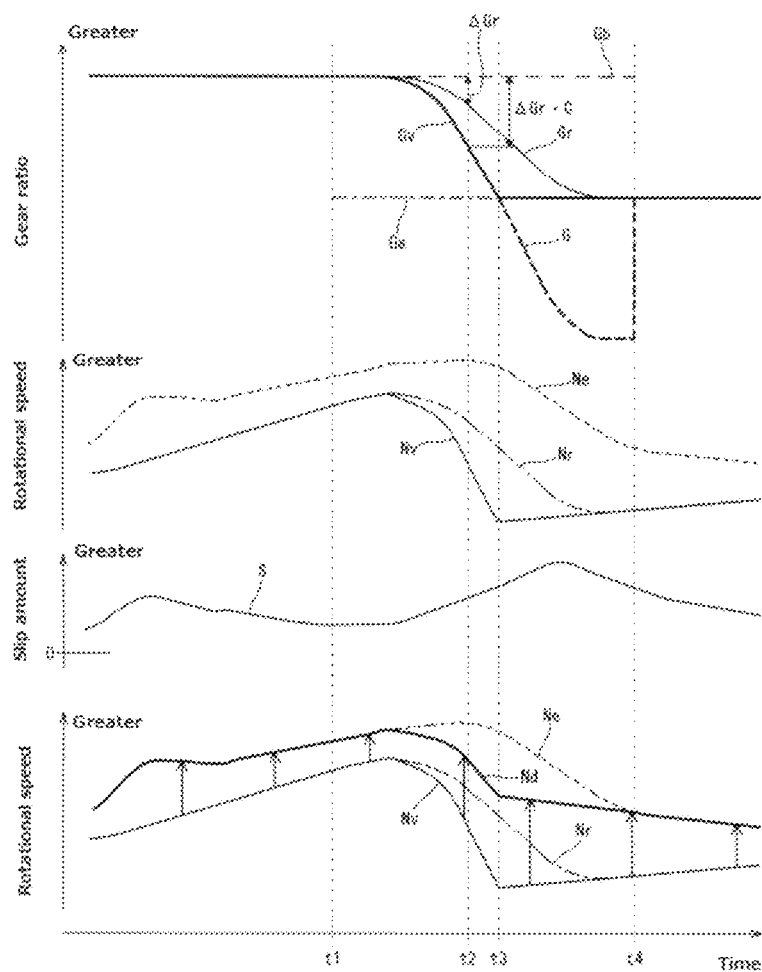

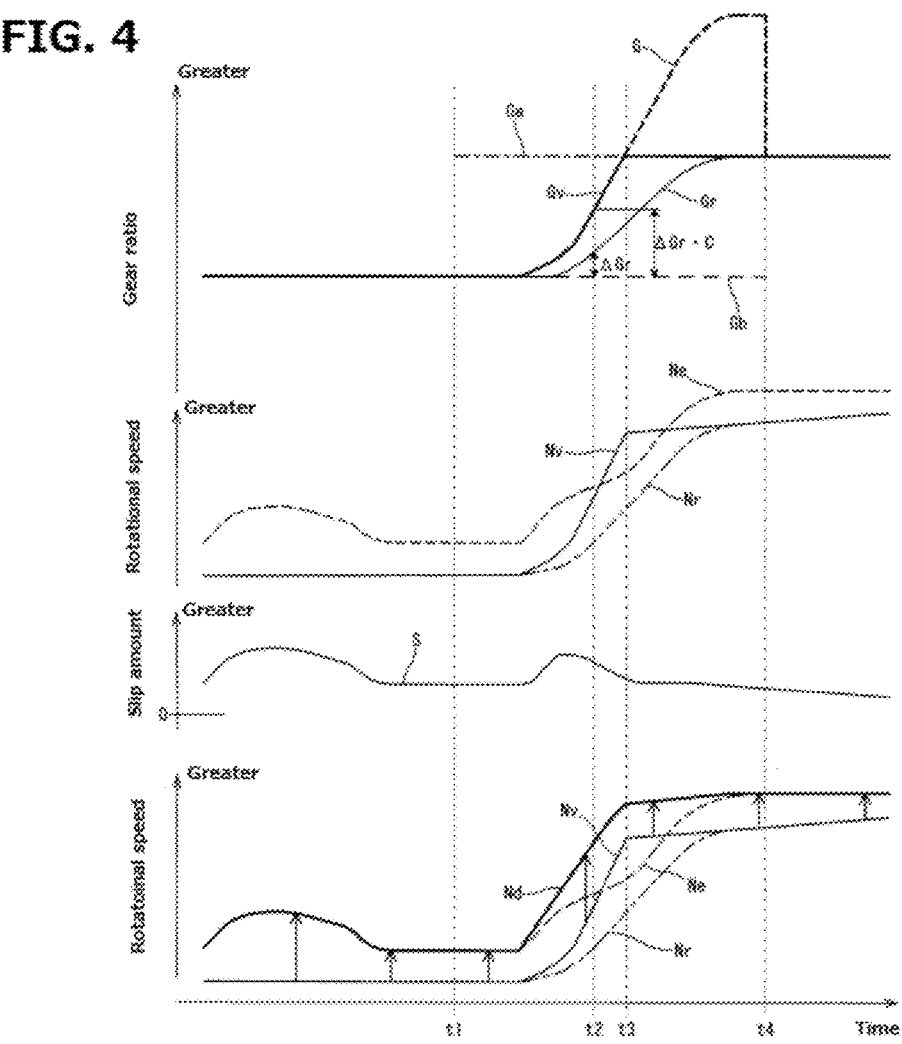

ROTATIONAL ENGINE SPEED DISPLAY DEVICE

TECHNICAL FIELD

The present invention relates to an in-vehicle rotational speed display device for displaying an engine rotational speed of an internal combustion engine.

BACKGROUND

For example, Patent Document 1 discloses a technique for improving a visual perception of shift response by allowing a variation of the engine rotational speed displayed on a rotational speed display device faster than an actual rotational variation of the internal combustion engine at the time of shifting.

In Patent Document 1, when it is determined that an inertia phase is in place at the time of gear shifting, a subtraction of the turbine rotational speed at the initial gear stage from an actual rotational speed at the start of the inertial phase is added to a turbine rotational speed at a target gear shift, and the result thus calculated is used for the rotational speed for meter display.

However, when the actual change rate of the engine rotational speed is slower than the assumed rate, the change speed of the engine rotational speed for display becomes too faster than the change speed of the actual engine rotational speed. In this case, the deviation between the meter or display engine rotational speed and the engine sound or a vehicle acceleration variation becomes excessive, which may cause the driver to feel uncomfortable.

PRIOR ART LITERATURE

Patent Document

Patent Document 1: JP 2009-220678 A

SUMMARY OF THE INVENTION

The present invention relates to an engine rotational speed display device mounted on a vehicle in which a driving force of an internal combustion engine is transmitted to a driving wheel via an automatic transmission, wherein a calculating unit in which an engine rotational speed for display is calculated using a virtual gear ratio which assures that the amount of gear ratio change of the automatic transmission relative to the previous or pre-shift gear ratio is equal to or greater than an actual gear ratio of the automatic transmission, and a display unit displaying the engine rotational speed thus calculated for display are provided.

According to the present invention, it is possible to provide a driver with a visually good perception of engine rotational speed reflecting the shift response.

BRIEF DESCRIPTION OF THE DRAWINGS

FIG. 3 is a timing chart showing a situation at the time of upshifting of the automatic transmission; and FIG. 4 is a timing chart showing a situation at the time of downshifting of the automatic transmission.

EMBODIMENT FOR IMPLEMENTING THE INVENTION

Below, a description will be given of an embodiment according to the present invention with reference to the drawings.

Figure 1:
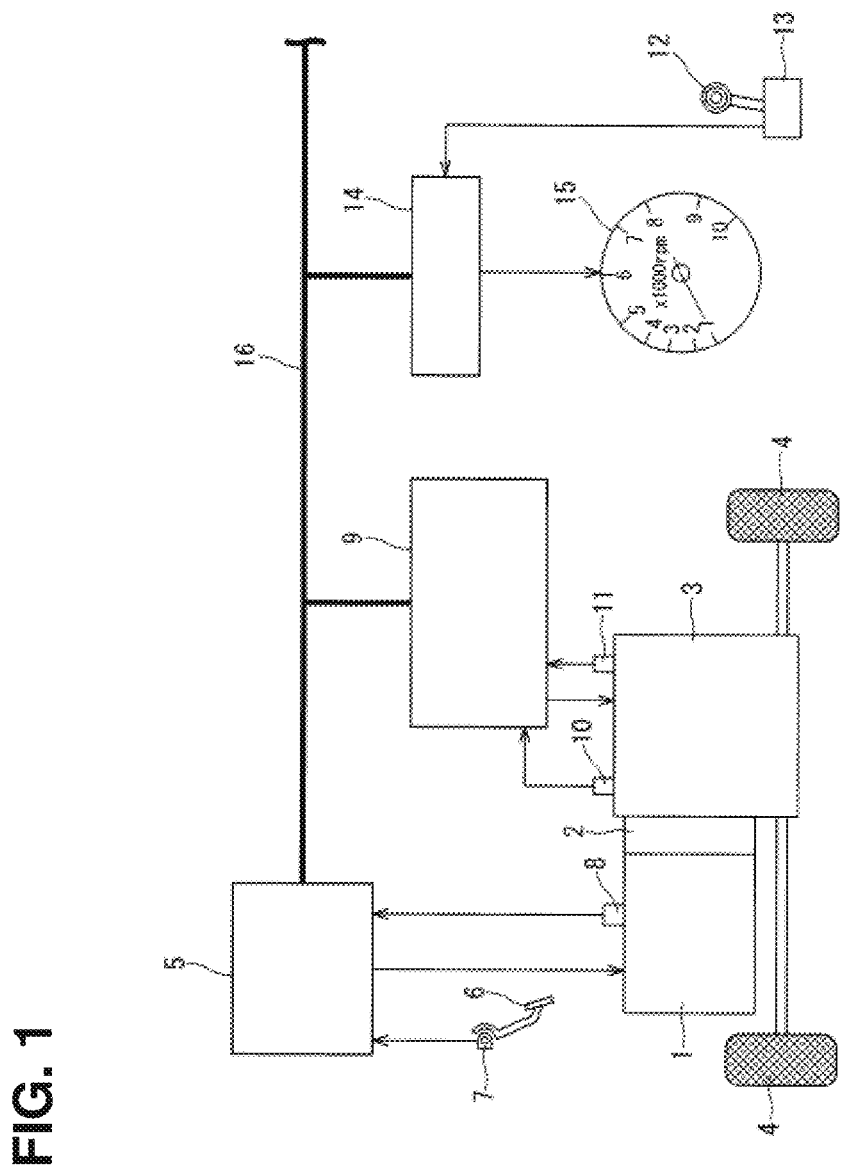
FIG. 1 is an explanatory view schematically showing a system configuration of a power transmission system of a vehicle to which a rotational speed display device according to the present invention is applied.

FIG. 1 is an explanatory diagram schematically showing a system configuration of a power transmission system of a vehicle to which a rotational speed display device according to the present invention is applied.

An internal combustion engine 1 is mounted on a vehicle as a drive source. The internal combustion engine 1 is connected to the automatic transmission 3 via a torque converter 2 having a lock-up mechanism. The automatic transmission 3 transmits the driving force of the internal combustion engine 1 to the driving wheels 4, 4 via a final reduction gear (not shown).

The internal combustion engine 1 is controlled by an ECM (engine control module) 5. The ECM 5 includes a microcomputer including a CPU, a ROM, a RAM, and the like.

The ECM 5 is provided with an accelerator opening degree sensor 7 for detecting an opening degree (depression amount) of an accelerator pedal 6 operated by a driver, a crank angle sensor 8 for detecting a rotational speed (engine rotational speed Ne) of a crankshaft (not shown), and other detected signals from various sensors. The ECM 5 controls the timing of fuel injection, the ignition timing of the internal combustion engine 1, the throttle opening degree, and the like, based on the detected signals from these various sensors.

The automatic transmission 3 is a step stage transmission, and, by selectively engaging and releasing a plurality of frictional elements (such as clutches, brakes, etc.) to thereby attain a combination of engagement/disengagement of these frictional elements, for example, a step automatic transmission of a seven-speed-forward and one-speed-reverse drive will be available.

The automatic transmission 3 is controlled by a TCU (transmission control unit) 9. The speed change speed or shift speed of the automatic transmission 3 is not necessarily constant. In order to suppress the shift shock, the shift speed will be determined in response to various adaptations according to, for example, an input torque to the automatic transmission 3, a differential rotational speed before and after the shift, a friction coefficient of the friction engagement elements of the automatic transmission 3, and/or based on the results of a feedback control, learning control, and the like.

The TCU 9 includes a microcomputer including a CPU, a ROM, a RAM, and the like. The TCU 9 receives various signals of an input shaft rotation sensor 10 for detecting a rotational speed of an input shaft (not shown) of the automatic transmission 3, an output shaft rotation sensor 11 for detecting a rotational speed of an output shaft (not shown) of the automatic transmission 3, an inhibitor switch 13 for detecting the operation position of the select lever 12, and the like. The TCU 9 controls shift control of the automatic transmission 3 by hydraulic pressure and engagement/disengagement control of a lockup clutch (not shown) of the lockup mechanism on the basis of detected signals from these sensors.

Further, the TCU 9 calculates an engine rotational speed for display or the display engine rotational speed Nd based on signals from various sensors. That is, the TCU 9 corresponds to the calculating unit. More specifically, the calculating unit includes a first calculating section that calculates an actual gear ratio Gr of the automatic transmission 3, a second calculating section that calculates a change amount $\Delta Gr$ of the actual gear ratio Gr with respect to the gear ratio Gb before shifting or at pre-shifting, and a third calculating section that calculates a virtual gear ratio Gv during gear shifting in accordance with the change amount of the actual gear ratio $\Delta Gr$, a fourth calculating unit that calculates the display engine rotational speed Nd using the rotational speed Nr of the input shaft of the automatic transmission 3, the actual gear ration Gr, and the virtual gear ratio Gv, and a fifth calculating section that calculates a slip amount S of the torque converter 2.

The display engine rotational speed Nd calculated by the TCU 9 is output to a tachometer 15 as a display unit via a Meter CU (meter control unit) 14.

The tachometer 15 is provided on an instrument panel in the vehicle interior, and displays the display engine rotational speed Nd calculated by the TCU 9.

The ECM 5, the TCU 9, and the Meter CU 14 are connected by a CAN communication line 16. Data can be exchanged between the ECM 5, the TCU 9, and the Meter CU 14 via the CAN communication line 16. Thus, the information such as the engine rotational speed Ne and the like is input from the ECM 5 to the TCU 9 while detected signals from an inhibitor switch 13 and the like are inputted from the Meter CU 14.

Figure 2:
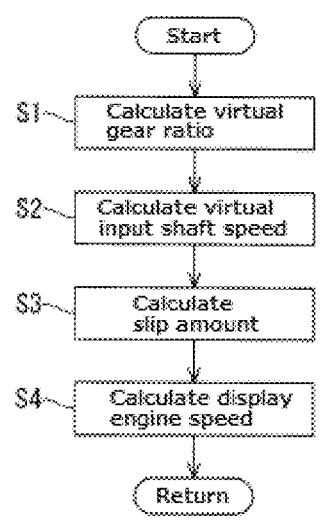
FIG. 2 is a flowchart showing a flow of calculation processing of an engine rotational speed for display.

FIG. 2 is a flowchart showing the flow of calculation processing of the display engine rotational speed Nd calculated by the TCU 9.

In S1, the virtual gear ratio Gv during shifting is calculated according to the change amount $\Delta Gr$ of the actual gear ratio Gr of the automatic transmission 3. Specifically, first, the change amount of actual gear ratio $\Delta Gr$ is calculated by subtracting a gear ratio Gb before shifting or a pre-shift gear ratio from the actual gear ratio Gr. That is, the actual gear ratio change amount $\Delta Gr$ is calculated by the following equation (1).

[Equation 1]

$$\Delta Gr = Gr - Gb \tag{1}$$

The actual gear ratio Gr is obtained by dividing the actual input shaft rotational speed Nr of the automatic transmission 3 by the output shaft rotational speed No of the automatic transmission 3. The actual input shaft rotational speed Nr is detected by the input shaft rotation sensor 10 and the output shaft rotation speed No is detected by the output shaft rotation sensor 11.

Subsequently, the gear ratio G is calculated by multiplying the actual gear ratio change amount $\Delta Gr$ a predetermined coefficient C (C>1) and adding the product to the pre-shift gear ratio Gb. That is, the gear ratio G is calculated by the following equation (2).

[Equation 2]

$$G = Gb + \Delta Gr \times C \tag{2}$$

When the shift of the automatic transmission 3 is an upshift operation, the gear ratio G is compared with a gear ratio of shift destination or a target gear ratio Ga, and a greater value is set as the virtual gear ratio Gv. When the shift of the automatic transmission 3 is a downshift operation, the gear ratio G is compared with the target gear ratio Ga, and the smaller value is set as the virtual gear ratio Gv.

In other words, the virtual gear ratio Gv may be set in a range between the pre-shift gear ratio Gb and the target gear shift ratio Ga, and changes at a changing speed faster than the actual gear ratio Gr.

Note that, when there is no change in the actual gear ratio Gr, since the pre-shift gear ratio Gb and the actual gear ratio Gr have the same value, the virtual gear ratio Gv has the same value as the pre-shift gear ratio Gb.

In S2, a virtual input shaft rotational speed Nv of the automatic transmission 3 corresponding to the virtual gear ratio Gv is calculated. Specifically, the virtual input shaft rotational speed Nv is calculated first by dividing the actual gear ratio Gr by the virtual gear ratio Gv to obtain a quotient value and subsequently by dividing the actual input shaft rotational speed Nr of the automatic transmission 3 by the quotient value. That is, the virtual input shaft rotational speed Nv is calculated by the following equation (3).

[Equation 3]

$$Nv = Nr/(Gr/Gv) \tag{3}$$

When there is no change in the actual gear ratio Gr, the virtual gear ratio Gv has the same value as the actual gear ratio Gr. Thus, the virtual input shaft rotational speed Nv has the same value as the actual input shaft rotational speed Nr.

In S3, a slip amount S in the torque converter 2 is calculated. Specifically, the slip amount S is calculated by subtracting the actual input shaft rotational speed Nr of the automatic transmission 3 from the engine rotational speed Ne representative of the rotational speed of the crankshaft. The engine rotational speed Ne is detected by the crank angle sensor 8. That is, the slip amount S is calculated by the following equation (4).

[Equation 4]

$$Ne - Nr = S \tag{4}$$

In S4, the display engine rotational speed Nd displayed on the tachometer 15 is calculated. Specifically, the display engine rotational speed Nd is calculated by adding the slip amount S calculated in S3 to the virtual input shaft rotational speed Nv calculated in S2. That is, the display engine rotational speed Nd is calculated by the following equation (5).

[Equation 5]

$$Nv + S = Nd \tag{5}$$

That is, when there is no change in the actual gear ratio Gr of the automatic transmission 3, even when the torque converter 2 is in the slipping state, the display engine rotational speed Nd can be made equal to the engine rotational speed Ne.

In addition, when there is a change in the actual gear ratio Gr of the automatic transmission 3, even when the torque converter 2 is in the slipping state, it is possible to suppress the deviation between the display engine rotational speed Nd and the engine rotational speed Ne while maintaining the rate of change of the display engine rotational speed Nd to be higher than the rate of change of the engine rotational speed Ne.

FIG. 3 is a timing chart showing a situation at the time of upshifting of the automatic transmission 3.

When the driver operates the select lever 12 to upshift at the timing of time t1, the automatic transmission 3 starts shifting control. That is, the shift control of the upshift of the automatic transmission 3 is started from the timing of time t1, and the actual gear ratio Gr (solid line) of the automatic transmission 3 decreases toward the target gear ratio Ga (one-dot chain line) shown in FIG. 3.

Here, the virtual gear ratio Gv (bold line) decreases toward the target gear ratio Ga at the timing of time t3, and assumes the same value as the target gear ratio Ga at and after time t3.

Between time t1 and time t3, since the gear ratio G is greater than the target gear ratio G, the virtual gear ratio Gv has the same value as the gear ratio G (bold broken line). AT and after the time t3, the gear ratio G becomes smaller than the target gear ratio Ga. Thus, the virtual gear ratio Gv is the same value as the target gear ratio Ga.

The change amount ΔG in the gear ratio G with respect to the pre-shift gear ratio Gb is set to a value obtained by multiplying the actual gear ratio change amount ΔGr and a coefficient C. For example, the gear ratio change amount ΔG at the timing of time t2 (t1<t2<t3) is a value obtained by multiplying the actual gear ratio change amount ΔGr at the time t2 by the coefficient C. That is, it is assured that the change amount of the virtual gear ratio Gv is equal to or greater than the actual gear ratio change amount ΔGr.

The virtual input shaft rotational speed Nv (solid line) is calculated by first dividing the actual gear ratio Gr by the virtual gear ratio Gv, and dividing the actual input shaft rotational speed Nr (one-dot chain line) by that quotient. Therefore, at the time of gear shifting by upshifting, the virtual input shaft rotational speed Nv is smaller than the actual input shaft rotational speed Nr during transition.

Further, the display engine rotational speed Nd (bold solid line) is calculated by adding the slip amount S to the virtual input shaft rotational speed Nv. Therefore, at the time of shifting by the upshift, the display engine rotational speed Nd is smaller than the engine rotational speed Ne (broken line) at the time of transition.

Note that the shift control itself to upshift the automatic transmission 3, the control is performed up to the timing t4 after the actual gear ratio Gr assumes the target gear ratio Ga, i.e. not up to the timing in which the actual gear ratio Gr has reached the target gear ratio Ga.

During the upshift of the automatic transmission, the actual gear ratio change amount ΔGr calculated when the actual gear ratio Gr is increasing, that is, when the actual gear ratio Gr tends to increase will be held invalid. When the actual gear ratio change amount ΔGr is invalid, the virtual gear ratio Gv is calculated using the actual gear ratio change amount ΔGr calculated immediately before being made invalid.

FIG. 4 is a timing chart showing a situation at the time of downshifting of the automatic transmission 3.

At the timing of time t1, when the driver performs downshift by operating the select lever 12, the automatic transmission 3 starts shifting control. That is, the shift control of the downshift of the automatic transmission 3 is started from the time t1, and the actual gear ratio Gr (solid line) of the automatic transmission 3 moves and increases toward the target gear ratio Ga (one-dot chain line) in FIG. 4.

Here, the virtual gear ratio Gv (bold line) increases to the target gear ratio Ga at the timing of time t3 and assumes the same value as the target gear ratio Ga at and after the time t3.

Between time t1 and time t3, since the gear ratio G is smaller than the target gear ratio G, the virtual gear ratio Gv has the same value as the gear ratio G (bold broken line). At and after the time t3, the gear ratio G becomes greater than the gear ratio Ga. Thus, the virtual gear ratio Gv assumes the same value as the target gear ratio Ga.

The change amount ΔG of the gear ratio G with respect to the pre-shift gear ratio Gb is set to a value obtained by multiplying the actual gear ratio change amount ΔGr by the coefficient C. For example, the gear ratio change amount ΔG at the timing of the time t2 (t1<t2<t3) is a value obtained by multiplying the actual gear ratio change amount ΔGr at the time t2 by the coefficient C. That is, it is assured that the change amount of the virtual gear ratio Gv is equal to or greater than the actual gear ratio change amount ΔGr.

The virtual input shaft rotational speed Nv (solid line) is calculated by first dividing the actual gear ratio Gr by the virtual gear ratio Gv, and dividing the actual input shaft rotational speed Nr (one-dot chain line) by that quotient. Therefore, at the time of downshift operation, the virtual input shaft rotational speed Nv becomes greater than the actual input shaft rotational speed Nr during the transition time.

Further, the display engine rotational speed Nd (bold solid line) is calculated by adding the slip amount S to the virtual input shaft rotation speed Nv. Therefore, at the time of downshift, the display engine rotational speed Nd is greater than the engine rotational speed Ne (broken line) at the time of transition.

Note that the downshift gearshift control itself of the automatic transmission 3 does not end at the timing at which the actual gear ratio Gr has reached the transmission gear ratio Ga, but will be continued to time t4 after the actual gear ratio Gr has become the target gear ratio Ga.

During the downshift operation of the automatic transmission, the actual gear ratio change amount ΔGr calculated when the actual gear ratio Gr is decreasing, that is, when the actual gear ratio Gr is tends to decrease will be held invalid. When the actual gear ratio change amount ΔGr is held invalid, the virtual gear ratio Gv is calculated using the actual gear ratio change amount ΔGr calculated immediately before being held invalid.

In the embodiment described above, the display engine rotational speed Nd is calculated using the virtual gear ratio Gv with which the change amount with respect to the pre-shift gear ratio Gb is equal to or greater than the actual gear ratio Gr. Therefore, it is possible to visually obtain a good shift response by providing the driver with the display engine rotational speed Nd.

In addition, since the virtual gear ratio Gv is determined according to the actual gear ratio change amount ΔGr, the change rate or speed of the display engine rotational speed Nd corresponds to the change speed of the actual input shaft rotation speed Nr.

Therefore, it is possible to offer to the driver a display engine rotational speed and prevent the speed of change of the display engine rotational speed Nd from becoming too fast or too late with respect to the change speed of the engine rotational speed Ne, thereby preventing the driver from feeling uncomfortable.

By setting a range to be assumed by the virtual gear ratio Gv between the pre-shift gear ratio Gb and the target gear shift ratio Ga, when the speed of change of the display engine rotational speed Nd is higher than the change speed of the engine rotational speed Ne, it is possible to suppress a possible undershoot of the display engine rotational speed Nd, which may occur during upshifting of the automatic transmission 3 and a possible overshoot of the display engine rotational speed Nd, which may occur during downshift control of the automatic transmission 3.

Further, even when the progress of the actual gear ratio Gr is in the opposite direction during the shift control due to insufficient adaptation of the shift control of the automatic transmission 3 or the like, the actual gear ratio change amount ΔGr corresponding to the reversion is not reflected in the display engine rotational speed Nd. Thus, it is possible to prevent unnecessary fluctuation (wobbling) of the display engine rotational speed Nd.

When there is no change in the actual gear ratio Gr of the automatic transmission 3, the virtual gear ratio Gv has a value equal to the actual gear ratio Gr, and the virtual input shaft rotational speed Nv is equal to the actual input rotational speed Nr of the automatic transmission 3. Therefore, the display engine rotational speed Nd can be set to a value corresponding to the engine rotational speed Ne.

When there is a change in the actual gear ratio Gr of the automatic transmission 3, the virtual input shaft rotational speed Nv assumes a change speed corresponding to the virtual gear ratio Gv, and the display engine rotational speed Nd may be set to the change speed corresponding to the virtual gear ratio Gv.

Note that, as the automatic transmission 3 in the above-described embodiment, it is also possible to use a continuously variable transmission (CVT) or a dual clutch transmission (DCT).

In the above-described embodiment, the internal combustion engine 1 is connected to the automatic transmission 3 via the torque converter 2. However, The present invention is also applicable in an arrangement in which the internal combustion engine 1 is connected to the automatic transmission 3 without the torque converter 3 being interposed. In this case, the engine rotational speed Ne and the actual input shaft rotational speed Nr always have the same value. Thus, the virtual input shaft rotational speed Nv will be the display engine rotational speed Nd.

Further, the virtual gear ratio Gv or the virtual input shaft rotational speed Nv can also be corrected according to the driving situation. In this case, since the change speed of the display engine rotational speed Nd can be adjusted according to the driving condition, it is possible to provide the driver with the visually better shift response reflecting engine rotational speed Nd. Note that examples of the driving situation here include a driver's operation, a driving tendency of the driver, a running state, driving information of the automatic transmission 3 and the like. The driving operation of the driver is represented, for example, by a state in which an accelerator pedal is depressed (on state) or not depressed (off state). The driving tendency of the driver is represented, for example, by a strong intention for acceleration/deceleration or a weak intention thereof. The running state is indicated, for example, by a stopped state or a running state of the vehicle. Finally, the driving information of the automatic transmission 3 may be represented, for example, by an upshift or downshift operations.

The invention claimed is:

1. An engine rotational speed display device mounted on a vehicle in which a driving force of an internal combustion engine is transmitted to a driving wheel via an automatic transmission, comprising:
   a calculating unit that is configured to calculate a display engine rotational speed for display using a virtual gear ratio which assures that an amount of change of the automatic transmission relative to a pre-shift gear ratio is equal to or greater than an amount of change in the actual gear ratio of the automatic transmission relative to the pre-shift gear ratio, and
   a display unit that is configured to display the display engine rotational speed as the engine rotational speed, wherein the virtual gear ratio is calculated based on a change amount in the actual gear ratio relative to the pre-shift gear ratio.

2. The engine rotational speed display device according to claim 1, wherein the virtual gear ratio is set in a range between the pre-shift gear ratio and a target gear ratio.

3. The engine rotational speed display device according to claim 1, wherein, during an upshift of the automatic transmission, an actual gear ratio change amount relative to the pre-shift gear ratio calculated when the actual gear ratio is increasing will be held invalid, wherein, during a downshift operation of the automatic transmission, the actual gear ratio change amount relative to the pre-shift gear ratio calculated when the actual gear ratio is decreasing will be held invalid, and wherein, when the actual gear ratio change amount thus calculated relative to the pre-shift gear ratio is held invalid, the virtual gear ratio is calculated using the actual gear ratio change amount that is calculated immediately before the actual gear ratio change is held invalid.

4. The engine rotational speed display device according to claim 1, wherein the virtual input shaft rotational speed is calculated first by dividing the actual gear ratio by the virtual gear ratio to obtain a quotient value, and then by dividing the actual input shaft rotational speed of the automatic transmission by the quotient value, and wherein the virtual input shaft rotational speed is used as the display engine rotational speed.

5. The engine rotational speed display device according to claim 1, wherein the virtual input shaft rotational speed is calculated first by dividing the actual gear ratio by the virtual gear ratio to obtain a quotient value, secondly by dividing the actual input shaft rotational speed of the automatic transmission by the quotient value, and wherein a slip amount of the torque converter is added to the virtual input shaft rotational speed for use as the display engine rotational speed.

6. The engine rotational speed display device according to claim 4, wherein one of the virtual gear ratio and the virtual input shaft rotational speed is corrected according to a driving condition.

* * * * *